April 3, 1945.  J. D. BREGIN  2,372,931
SPLINE ARBOR
Filed Aug. 2, 1943  3 Sheets-Sheet 1
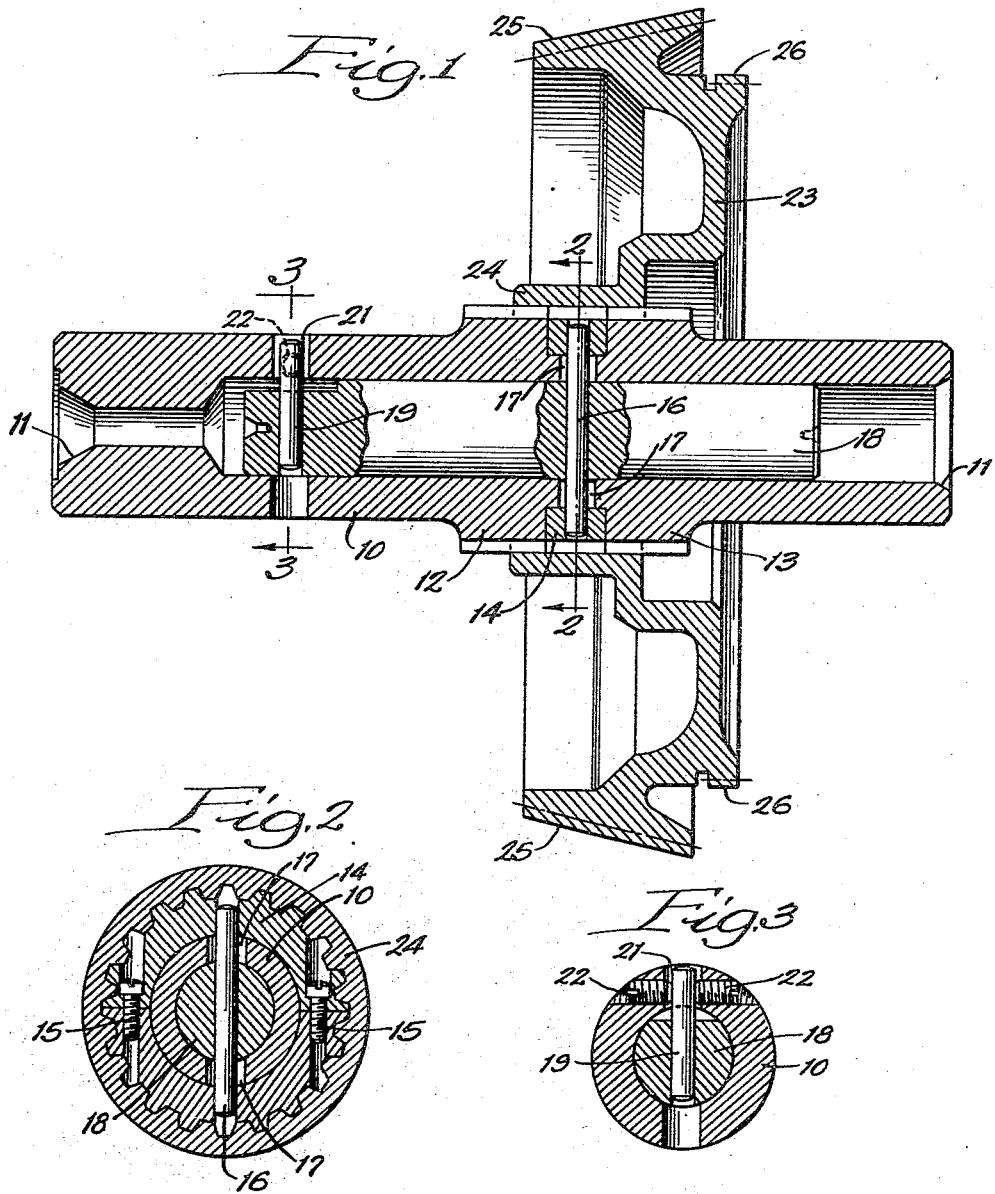
Inventor:
John D. Bregin,
By Dawson, Ooms & Booth,
Attorneys.

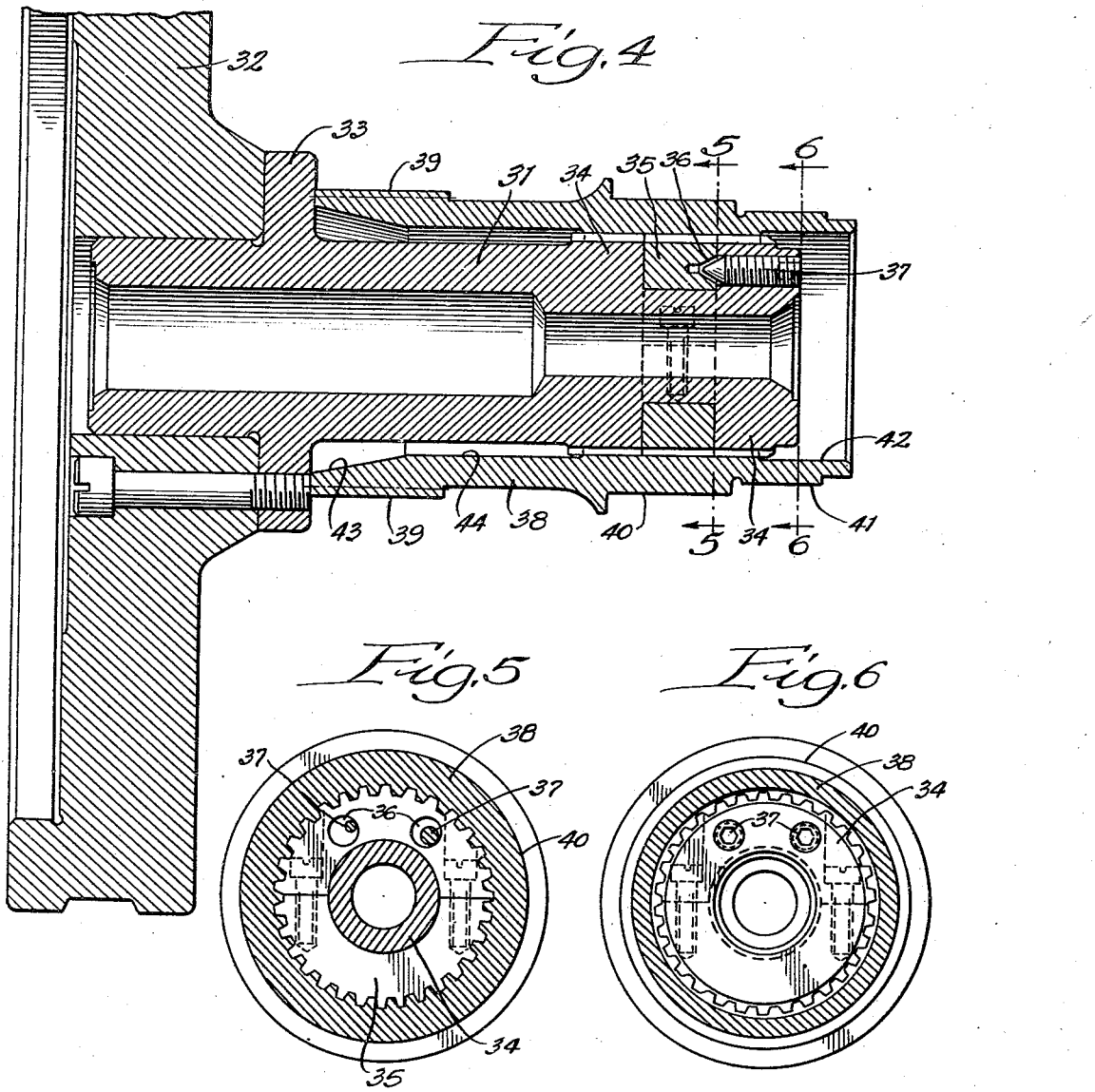

April 3, 1945. J. D. BREGIN 2,372,931
SPLINE ARBOR
Filed Aug. 2, 1943 3 Sheets-Sheet 3
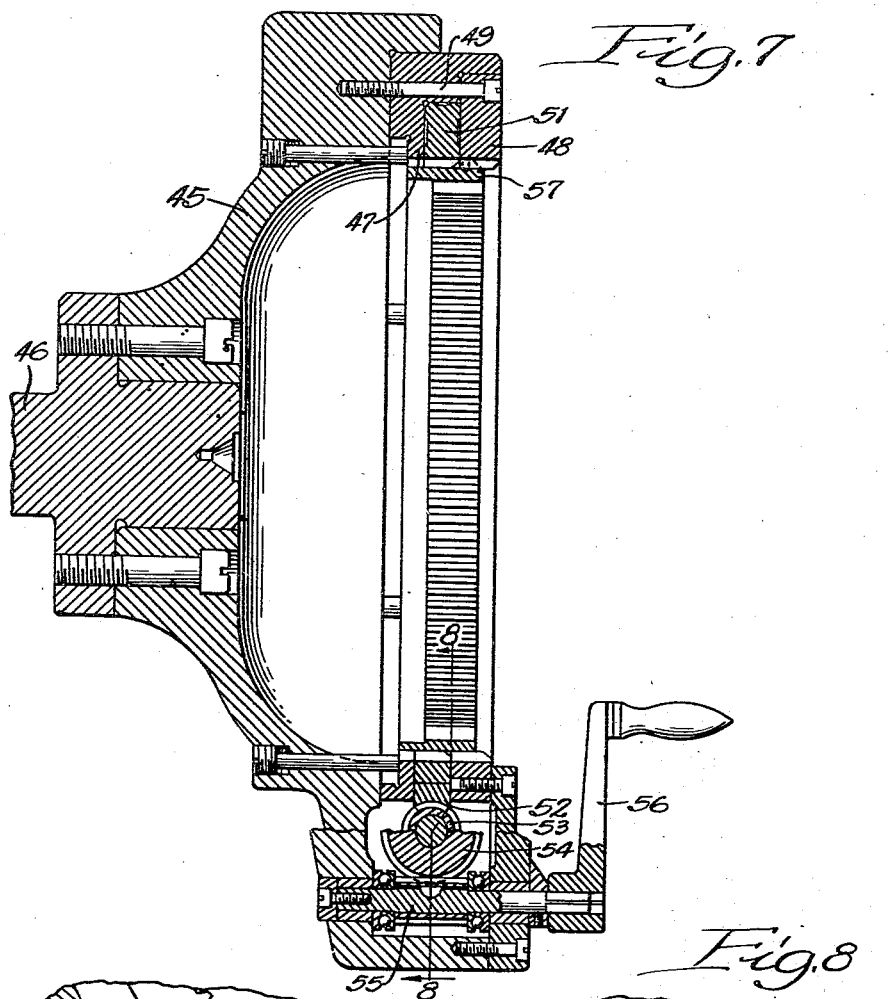
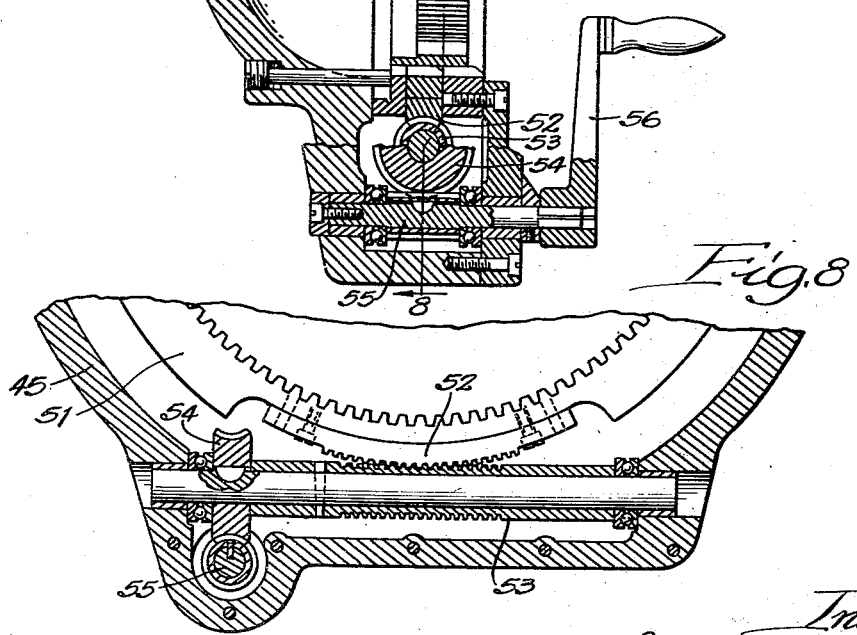

Patented Apr. 3, 1945

2,372,931

UNITED STATES PATENT OFFICE 2,372,931

SPLINE ARBOR

John D. Bregin, Chicago, Ill., assignor to Foot Bros. Gear and Machine Corporation, Chicago, Ill., a corporation of Delaware Application August 2, 1943, Serial No. 497,050

11 Claims. (82—43)

This invention relates to spline arbor and more particularly to an arbor for holding an externally or internally splined part for machining or finishing operations.

In the manufacture of many parts having internal or external splines or gear teeth, it is necessary to machine or otherwise finish one or more surfaces concentric with the splines. Heretofore, such parts have been supported in relatively complicated chucking devices requiring accurate machining and careful adjustment and which are difficult to keep in proper working order.

One of the objects of the present invention is to provide a spline arbor which is simple in construction and use which comprises a minimum number of moving parts and which accurately supports a splined or gear part.

Another object of the invention is to provide a spline arbor which does not require an extremely accurate fit with the parts to be supported.

Still another object of the invention is to provide a spline arbor which automatically centers the part on its spline or gear teeth so that the surfaces machined with the part mounted are accurately centered with the splines.

The above and other objects and advantages of the invention will be more readily apparent from the following description when read in connection with the accompanying drawings, in which—

Figure 1 is an axial section of a spline arbor embodying the invention with a part to be machined mounted thereon;

Figures 2 and 3 are partial sections on the lines 2—2 and 3—3 respectively of Figure 1.

Figure 4 is a view similar to Figure 1 of an alternative construction;

Figures 5 and 6 are sections on the lines 5—5 and 6—6 respectively of Figure 4;

Figure 7 is an axial section of a further construction embodying the invention; and Figure 8 is a partial section on the broken line 8—8 of Figure 7.

The arbor shown in Figures 1 to 3 comprises a tubular shaft 10 having coaxial conical supporting surfaces 11 at its opposite ends on which it may be rotatably mounted in a machine. The shaft 10 is formed on its exterior surface with two externally splined or geared parts 12 and 13 spaced apart axially to leave an annular groove between them. As shown, the parts 12 and 13 are integral with the shaft but it will be understood that they could, if desired, be separate rings rigidly mounted on the shaft.

Between the two parts 12 and 13 there is mounted a split ring 14 made up as best seen in Figure 2 of two semi-circular sections joined by machine screws 15. The exterior surfaces of the parts 12 and 13 and the ring 14 are formed with identical spline or gear teeth which in one position of the ring are axially alined and which are preferably formed simultaneously by a single machining operation. As shown, the gear teeth are of involute form which is the preferred construction although teeth of other shapes will operate satisfactorily.

The ring 14 is angularly movable on the shaft and its angular position is adapted to be controlled by means of a pin 16 connected at its ends to the ring and extending loosely through slots 17 in the shaft. The pin passes diametrically through a rod 18 rotatably mounted in the interior of the shaft and carrying at one end a radially extending pin or projection 19. The end of the pin 19 lies in an enlarged opening 21 in the shaft 10 and is engaged on its opposite sides by tangentially extending screws 22 threaded into the shaft.

During the machining operation, both of the screws 22 are preferably tightened to center the pin 19 in the opening 21 as shown in Figure 3. This rigidly fixes the ring 14 on the shaft and prevents any angular movement thereof so that gear teeth on the ring and on the parts 12 and 13 will be accurately aligned and of the same configuration.

The arbor is adapted to support any desired type of work piece such, for example, as the beveled gear 23 shown in Figure 1. This gear is formed with an internally splined hub 24 and with an externally conical portion 25 which is to be machined concentric with the hub 24. An extending hub portion 26 may also require finishing concentric with the splines in the hub 24.

The size of the parts 12 and 13 and ring 14 is preferably such as to form a relatively loose fit with the internal splines of the hub 24 so that the arbor may be slipped easily into place in the hub. The hub is assembled on the arbor as seen in Figure 1 with the splines thereon spanning the ring 14 and engaging the teeth on the parts 12 and 13. With the parts in this position, one of the set screws 22 may be tightened to turn the ring slightly relative to the parts 12 and 13. This causes the teeth on the ring to engage one side of the splines on the hub while the teeth on the parts 12 and 13 are pressed against the opposite sides of the hub splines. Since the hub splines are engaged at three points, by concentric parts there will be no tendency to tilt the hub and its radial position relative to the axis of the shaft will be accurately fixed. Furthermore, the teeth on the ring and parts tend to wedge the splines on the hub outwardly with equal force in all circumferential positions so that the hub will be accurately centered on its splines regardless of the fact that the splines fit relatively loosely on the arbor. With the part thus assembled on the arbor, the surfaces 25 and 26 as well as any other desired surfaces may be machined to an extremely accurate degree of concentricity with the splines. It will be noted that the arbor will accurately center a work piece even after substantial wear and that when one side of the teeth on the ring and arbor parts become worn, the other side may be used by turning the ring in the opposite direction. This arbor construction, therefore, provides extremely long life with a high degree of accuracy throughout.

Figures 4 to 6 illustrate an alternative construction in which an end or internal machining operation on the work piece may be performed. As shown in these figures, the arbor comprises a shaft 31 which may be tubular as shown or solid. The shaft 31 is supported at one end in a rotatable plate 32 by means of a flange 33 integral with the shaft so that it forms a stub shaft. Adjacent the outer end of the shaft it is formed with spaced toothed parts 34 with a split ring 35 rotatably mounted on the shaft between the parts 34. The parts 34 and ring 35 are formed with aligned teeth similar to those on the parts 12 and 13 and ring 14 of Figure 1.

In order to control the angular position of the ring on the shaft the ring is formed in one of its faces with a pair of conical recesses 36 spaced circumferentially as shown in Figure 4. A pair of conical ended screws 37 are threaded into the shaft to engage the recesses 36, the screws being spaced circumferentially a different distance than the recesses as appears in Figures 5 and 6.

For forming the teeth on the parts 34 and ring 35, the two screws 37 are adjusted equally so that they will engage the sides of the recesses 36 in opposition to each other and will hold the ring rigidly in centered position on the shaft. To turn the ring on the shaft one of the screws may be backed off while the other is tightened so that the camming effect of the screw which is tightened will turn the ring slightly.

The arbor is adapted to support a work-piece which may be of the form shown at 38 in Figure 4 having a plurality of external surfaces 39, 40 and 41 to be machined concentrically and an internal surface 42 adjacent one end to be machined concentric to the external surfaces. With the part 38 mounted on the arbor as shown, it will be apparent that all of these surfaces may be machined with one machine set up so that extremely accurate concentricity is obtained. If additional interior surfaces such as shown at 43 and 44 require machining, the part may be reversed on the arbor to expose these surfaces which may then be machined concentric with the splines with a high degree of accuracy.

The construction shown in Figures 7 and 8 is adapted to support an externally splined or geared part such, for example, as a double ring gear. This construction includes an enlarged dished support 45 mounted on a shaft 46 for rotation. The support 45 carries adjacent its outer end a pair of spaced rings 47 and 48 having internal aligned teeth thereon. The parts 47 and 48 may be formed integrally with the support in any desired manner but as shown are separate rings rigidly mounted on the support by mounting screws 49.

Between the rings 47 and 48 there is rotatably mounted a ring 51 having a series of internal teeth thereon aligned with and of the same shape as the teeth on rings 47 and 48. The angular position of the ring 51 on the support is controlled by securing to the outer surface of the ring a worm segment 52 which is detachably connected to the ring. It is preferred to use a separate worm segment as shown which may be made of a relatively soft material such as brass so that if the worm teeth wear the segment can be replaced without requiring replacement of the entire ring. The segment 52 meshes with a worm 53 rotatably mounted in the support and which carries a worm gear 54. The worm gear 54 in turn meshes with a worm 55 rotatably mounted in the support and projecting therefrom to carry a crank 56.

With this construction the worms may be made self-locking so that the ring 51 will be securely held in any adjusted position and so that a substantial movement of the crank 56 is permitted to turn the ring 51 a relatively small amount.

The arbor of Figures 7 and 8 is adapted to support a double ring gear 57 having both internal and external teeth. In constructing a gear of this type the external teeth are preferably formed first on the blank. Upon completion of this operation the ring gear may be placed in the arbor with its external teeth meshing with the teeth on rings 47 and 48 and 51. Upon turning the crank 56 the ring 51 will be moved angularly to wedge the teeth on the gear so that the internal teeth may thereafter be furnished with a high degree of concentricity relative to the external teeth.

If a gear clamped in the arbor as explained is slightly out of round, the wedging action of the teeth on rings 47, 48 and 51 on the gear teeth will tend to force the gear back into round since the rings are round and their teeth act equally on the gear teeth completely around the circumference.

While several embodiments of the invention have been shown and described herein in detail it will be understood that these are illustrative only and are to be taken as a definition of the scope of the invention, reference being had for this purpose to the appended claims.

What is claimed is:

1. A spline arbor comprising a support adapted to be mounted in a machine, a pair of annular tooth portions rigidly carried on the support spaced axially and having alined substantially identical teeth thereon, a ring rotatably mounted on the support between said annular portions, the ring having teeth thereon substantially identical with the teeth on the annular portions, and cooperating means on the support and the ring to turn the ring relative to the annular portions, the teeth on the annular portions and the ring being adapted to engage teeth on a work piece to hold the workpiece centered on the support.

2. A spline arbor comprising a support adapted to be mounted in a machine, a pair of annular toothed portions rigidly carried on the support spaced axially and having alined substantially identical teeth thereon, a ring rotatably mounted on the support between said annular portions, the ring having teeth thereon substantially identical with the teeth on the annular portions, and cooperating means on the support and the ring to turn the ring relative to the annular portions, the teeth on the ring and annular portions being of involute form to engage teeth on a work piece and hold the work piece centered on the support.

3. A spline arbor comprising an elongated shaft, a pair of axially spaced toothed portions on the shaft, a toothed ring angularly movable on the shaft between the toothed portions, the teeth on the ring and toothed portions being alined in one angular position of the ring, and means to move the ring angularly on the shaft.

4. A spline arbor comprising an elongated shaft, a pair of axially spaced toothed portions on the shaft, a toothed ring angularly movable on the shaft between the toothed portions, the teeth on the ring and toothed portions being alined in one angular position of the ring, and adjustable means carried by the shaft and engageable with the ring to adjust the angular position of the ring on the shaft.

5. A spline arbor comprising an elongated shaft, a pair of axially spaced toothed portions on the shaft, a toothed ring angularly movable on the shaft between the toothed portions, the teeth on the ring and toothed portions being alined in one angular position of the ring, a rod rotatably mounted in the shaft and connected to the ring, a radial extension on the rod and opposed screws in the shaft lying substantially tangent thereto and engaging the opposite sides of the extension.

6. A spline arbor comprising an elongated shaft, a pair of axially spaced toothed portions on the shaft, a toothed ring angularly movable on the shaft between the toothed portions, the teeth on the ring and toothed portions being alined in one angular position of the ring, the ring having a substantially conical recess in one face thereof, and an axially extending screw in the shaft engageable with the recess to control the angular position of the ring on the shaft.

7. A spline arbor comprising an elongated shaft, a pair of axially spaced toothed portions on the shaft, a toothed ring angularly movable on the shaft between the toothed portions, the teeth on the ring and toothed portions being alined in one angular position of the ring, the ring having a pair of circumferentially spaced substantially conical recesses in one face thereof, and a pair of conical pointed screws in the shaft engageable with the recesses respectively, the screws being spaced a different circumferential distance than the recesses.

8. A spline arbor comprising a pair of rigidly connected axially spaced rings having alined internal teeth thereon, a third ring mounted for angular movement between the pair of rings and having internal teeth thereon alined with the teeth on the pair of rings in one angular position, and means for adjusting the angular position of the third ring relative to the pair of rings.

9. A spline arbor comprising a support adapted to be rotatably mounted, a pair of axially spaced rings rigidly carried by the support and formed with alined internal teeth, a third ring mounted for angular movement on the support between the pair of rings and formed with internal teeth alined with the teeth on the pair of rings in one angular position, and means on the support engageable with the third ring to adjust the angular position of the third ring on the support.

10. A spline arbor comprising a support adapted to be rotatably mounted, a pair of axially spaced rings rigidly carried by the support and formed with alined internal teeth, a third ring mounted for angular movement on the support between the pair of rings and formed with internal teeth alined with the teeth on the pair of rings in one angular position, the third ring having throughout at least a part of its periphery a series of external worm teeth, a worm on the support meshing with the worm teeth, and means on the support to turn the worm.

11. A spline arbor comprising a support adapted to be rotatably mounted, a pair of axially spaced rings rigidly carried by the support and formed with alined internal teeth, a third ring mounted for angular movement on the support between the pair of rings and formed with internal teeth alined with the teeth on the pair of rings in one angular position, a worm gear segment secured to the third ring, a worm on the support meshing with the segment, and means on the support to turn the worm.

JOHN D. BREGIN.